Feb. 18, 1947.  J. F. JOY  2,415,887
JOURNAL SEAL
Filed Feb. 10, 1943
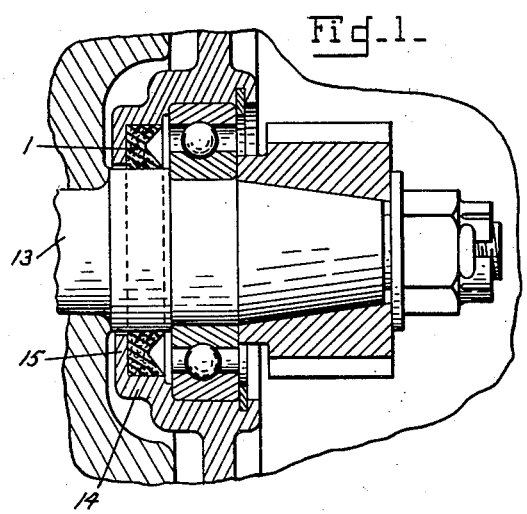
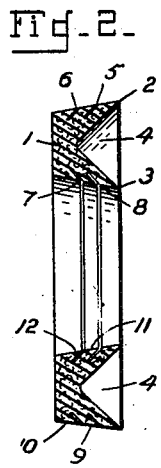
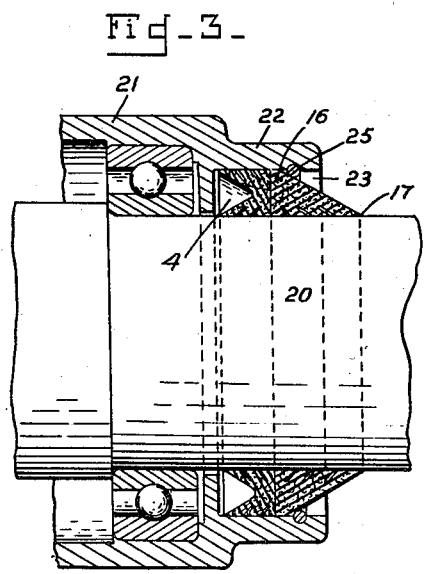
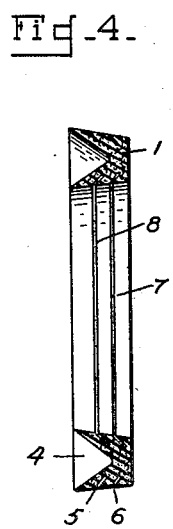
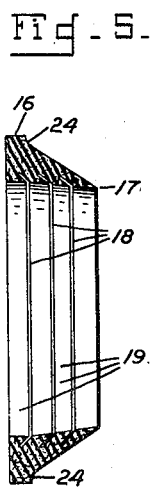
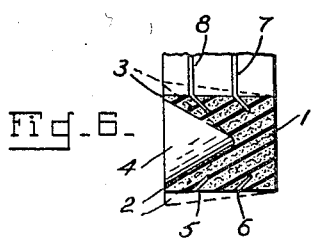
Inventor
Joseph F. Joy
By C. E. Herrstrom & H. E. Thibodeau
Attorneys Patented Feb. 18, 1947

2,415,887

UNITED STATES PATENT OFFICE 2,415,887

JOURNAL SEAL

Joseph F. Joy, Washington, D. C.

Application February 10, 1943, Serial No. 475,376

9 Claims. (Cl. 286—26)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to journal seals and is particularly directed to an improved type of seal commonly applied to the rotating parts of vehicles such as army tanks, trucks and automobiles.

It has been determined, particularly with respect to vehicles such as tanks and trucks, that under the stress of battle conditions, ordinary seals heretofore used are incapable of fulfilling their purpose due to the severity of the service to which they are subjected. In seals heretofore known, it has been common practice to use a garter or finger spring and a loaded flexible member contacting the moving element of the journal encased within a pressed steel or other metal container. The flexible member in the past has usually been composed of such material as leather, which is incapable of withstanding any considerable pressure upon the rotating part. It therefore follows that the retaining spring which maintains the contact between the sealing member and the rotating part must be delicately adjusted.

These springs frequently get out of adjustment when operating at high speeds and this results in their failure. Furthermore, the material thus used in the sealing member is incapable of withstanding any considerable frictional contact with the rotating part. The result is that rapid wear occurs thus causing early destruction of its sealing qualities.

In the use of those seals heretofore known it has been necessary to machine the various parts accurately with a high polish and maintain them in perfect alignment in order to have effective sealing. Such a condition is difficult to maintain to the desired practical extent under severe operating conditions. It is occasionally necessary to remove such journal seals to repair mechanisms in which they are used and in the past such removal of the seal has seldom been achieved without destruction thereof by reason of the tight fit necessary.

It is therefore one of the objects of this invention to provide a seal of more simple, effective and practical construction capable of withstanding the severe conditions imposed by modern high-speed mechanisms.

Another object of the invention is to provide a seal of such a construction that it can be easily removed for purposes of repair to the mechanisms in which they are used without destruction of the seal itself.

A further object of the invention is to provide a sealing ring which is formed of a resilient or elastic material and wherein the sealing walls thereof normally diverge, but which are flexed to substantial parallelism upon placing the seal in a straight walled cavity.

A still further object of the invention is to provide an annular seal having at least one sealing wall divided into a plurality of sealing lips, the wall in such case being inclined so that when inserted in a cavity, pressure will be exerted against the lips and spread them apart.

Other objects and purposes of the invention will become apparent upon reading the following description of preferred embodiments of the invention taken in connection with the accompanying drawing in which:

Figure 1 is a sectional view showing the manner in which one form of this seal might be employed as a means of preventing oil and/or grease from passing along a shaft into the interior of the adjacent casing;

Figure 2 is a sectional view of the preferred form of seal embodying my invention;

Figure 3 is a longitudinal section along a protruding axle shaft such as is common to tracklaying and wheeled vehicles. In this particular form of the invention it will be noted that two seals are used, one to prevent oil from passing outwardly from the interior of the axle housing and the other to prevent foreign matter from entering the housing from outside;

Figure 4 is a sectional view similar to Figure 2 of one of the sealing rings applied to the structure of Figure 3;

Figure 5 is a sectional view of another form of sealing ring particularly adapted for use, as shown in Figure 3, to prevent foreign matter from entering a sealed-in housing from outside; and Figure 6 is an enlarged fragmentary sectional view of the ring shown in Figures 2 and 4, wherein it may be clearly seen the manner in which the plurality of lips are spread apart from the normal dotted line position of the sealing lips to their position when inserted within a straight walled cavity.

Referring now more particularly to the drawing, Figure 2 discloses a preferred embodiment of the seal of my invention. As stated heretofore the seal comprises an annular ring formed of a resilient or elastic material and comprises a main body portion 1 terminating at one side thereof in spaced annular outer and inner sealing lips 2 and 3. These lips are separated by an annular groove 4. While it has been found in actual practice that the most practical form of groove is V-shaped, it is to be understood that this groove can assume other configurations without departing in any way from the spirit of the invention.

I then provide each of the inner and outer sealing walls with one or more annular slits such as shown at 5 and 6 on the outer wall and at 7 and 8 on the inner wall. It will be clear, of course, that the exact number of slits to provide separate sealing lips is not important, although two of such slits have been shown herein as illustrative. It will be noted that such slits are placed angularly with respect to the inner and outer sealing walls so that supplemental or auxiliary sealing lips such as 9 and 10 will be formed on the outer wall and similar lips 11 and 12 will be formed on the inner wall. These supplemental lips will then extend in the general direction of the outermost or terminal lips 2 and 3. It should further be noted at this time that both the inner and outer walls are preferably inclined or diverge outwardly away from each other so that when the seal is placed in a retaining cavity, the pressure thus exerted upon the sealing lips will cause a flexing thereof so that if the cavity is straight walled, the two sealing walls of the seal will be parallel.

It should further be noted at this time that although I have shown and described this particular seal as having the supplemental sealing lips on both the inner and outer walls, it is to be understood that such lips may be dispensed with on one or the other of such walls. It is, however, highly desirable that the supplemental lips be present on the wall which contacts the rotating part of the mechanism.

Figure 1 discloses a typical practical application of the seal shown in Figure 2 wherein a rotating shaft 13 is surrounded by a member 14 having an inwardly extending flange 15. This member then provides an annular straight walled cavity within which the seal can be located. It will be apparent that oil and/or grease will thus be prevented from passing along the length of the shaft 13 from the right hand end thereof toward the left as viewed in Figure 1. Any oil attempting to pass the seal will first become lodged in the annular groove 4, thus exerting pressure outwardly against the sealing lips 2 and 3 to thereby insure a still tighter seal. By dividing the sealing walls into a plurality of supplemental sealing lips a distinct advantage is attained by reason of the fact that if the outer lips become worn or for any other reason fail to function efficiently, the supplemental lips will be present to effectively prevent passage of oil.

Referring now particularly to Figure 5, there is disclosed a modified form of seal which, although embodying similar principles, is designed particularly for use on the end of an axle to prevent foreign materials such as dirt, mud and sand from entering along the shaft. In this form of the invention, the seal is also an annular ring having a main body portion 16 terminating in an annular sealing lip 17. Here again, it will be noted that, although only a single sealing wall is present, this wall is inclined. I also provide this inclined sealing wall with a plurality of slits 18, thus dividing the wall into a plurality of supplemental or auxiliary sealing lips 19.

Figure 3 discloses a practical application of the seal shown in Figure 5 in connection with the seal shown in Figure 4. In this application of the invention a shaft 20 is provided which is surrounded by an annular member 21 having a flange 22 thereon spaced from the shaft to thereby provide an annular straight walled retaining cavity 23. It will be noted that the sealing ring 1 is inserted in the cavity first with the sealing lips thereof extending toward the left to thus prevent oil and grease from passing along the shaft in the manner explained above with respect to Figure 1. The second seal 16 is then placed around the shaft adjacent the first seal. It should be noted that this second seal is provided with an annular shoulder 24 so that it may be held within the retaining cavity by means such as a ring 25. It will be noted that the sides of the inner wall of the second seal are moved to parallelism when applied to the shaft 20.

In the case of both types of seals the supplemental lips therein when placed in the cavity will be spread apart as more clearly shown in Figure 6, and in each case has the advantages outlined above.

The material of which these seals are composed is especially compounded for the purpose. Ordinary rubber cannot be used because of its tendency to absorb oil and thus be destroyed. It is important that seals, when used in the manner above explained, be not only resilient but also have heat and wear resisting qualities. The compound which I have found best suited for seals of this nature consists mainly of elements common to the processing of the various oil resisting synthetic rubbers or plastics such as "Neoprene," "Duprene," "Thiokol," "Hycar," and the like, except that powdered anti-friction metals such as bronze, brass, and other wear resisting and heat conducting material are substituted for a portion of the carbon or lamp black commonly used in such synthetics.

The powdered metal thus introduced in the form of dustlike particles preserves the rubberlike characteristics of the finished seal while at the same time provides resistance to wear and permits higher pressures between the seal and the part that it contacts and thus contributes to more effective sealing. This metal also transmits heat arising out of the frictional contact of the seal with the rotating part through the seal to its enclosing walls.

From the foregoing it will be clear that, since the seals embodying my invention are one-piece units complete unto themselves and of a higher flexibility and resilient form, they will readily adjust themselves to variations in machining and misalignment of parts. While I have shown and described herein but a few examples of the preferred embodiments of my invention, it will be clear that the invention is capable of being formed into other required shapes to meet the various sealing requirements of modern mechanisms and that any such changes may be made without departing in any way from the spirit of the invention as long as such changes come within the scope of the appended claims.

I claim:

1. In combination a seal housing including a wall having a generally annular groove, a seal received in said housing and having a plurality of spaced sealing lips disposed in one general direction, a second seal lodged in said housing with one of its inoperative surfaces abutting an inoperative surface of said first seal and having a sealing lip disposed in a direction generally opposite to that of said first lips, an abutment on said second seal, and a spring ring partially received in said groove engaging said abutment with at least a part of its protruding portion for aiding in controlling the positions of said seals.

2. In combination a seal housing having a wall provided with a generally annular groove, an annular seal ring having diverging sealing walls separated adjacent their most distantly spaced edges by a groove of substantial breadth adjacent its top and being each provided with at least one slit which, at least in part, overlaps said groove and which is inclined relative to an inactive surface of said seal, a second seal lodged in said seal housing with one of its inactive surfaces in abutment with said inactive surface of said first seal and being provided with an inclined sealing wall disposed in a direction generally opposite to the direction of disposition of the sealing walls of said first seal which has a slit intermediate its marginal edges the direction of which is inclined relative to said abutting surfaces, an abutment on said second seal, and a spring ring partially received in said groove of the housing wall engaging said abutment with at least a part of its protruding portion.

3. Seal structure for two relatively movable parts, comprising: a pair of seals disposed in back-to-back relation, the front of the inner seal having spaced peripherally extending sealing lips, each adapted to contact and seal an adjoining surface of a respective part, and the outer seal being wedge-shaped in cross-section, having a surface adapted to contact and seal one of said parts; and means adapted to abut the free surface of said outer seal, so constructed and arranged to hold said seal structure in operative relation with said parts.

4. Seal structure for two relatively movable parts, comprising: a pair of seals disposed in back-to-back relation, the front of the inner seal having spaced peripherally extending lips, each adapted to contact an adjoining surface of a respective part, and the outer seal being wedge-shaped in cross-section, providing a lip the surface of which is adapted to contact one of said parts, and each of the hereinbefore mentioned lips having slit means extending inwardly of its sealing surface.

5. Seal structure, comprising: a pair of seals disposed in back-to-back relation, the front end of each seal having a circumferentially extending lip which tapers in cross-section from the back to a feathered sealing edge, each of said lips providing a sealing surface which includes said feathered edge, and each also having slit means extending from said sealing surface inwardly of said lip and inclined in the same direction as its feathered edge, said slit means being constructed and arranged to open under pressure applied to said lip to form at least one sealing edge and collecting pocket spaced from the respective feathered edge.

6. Seal structure for two relatively movable parts, comprising: seal means interposed between said parts, having a portion adapted to lie along a surface of one of said parts, the terminal margins of said portion being inclined toward each other to provide first sealing edges at each end of said portion, and said portion having spaced-apart slit means inclined toward each other and located intermediate said terminal margins and providing second sealing edges, said first and second sealing edges being so constructed and arranged as to effect sealing against fluid flow in either direction along the surface of said one part.

7. A sealing member of resilient material for use with two surfaces which are to be sealed, comprising a body portion adapted to be disposed within space defined by said surfaces, including a lip, one surface of which forms a sealing surface flaring away from said body portion so as to be flexed upon engagement with one of said surfaces when said member is installed, said lip having one or more slits extending from said sealing surface and into the material thereof, whereby upon flexing of said sealing surface the slit or slits will open to form a pressure receiving pocket or pockets.

8. A sealing member of resilient material for use with two surfaces which are to be sealed, comprising a body portion adapted to be disposed within space defined by said surfaces, including spaced lips, one surface of each lip forming a sealing surface flaring away from said body portion so as to be flexed upon engagement with a respective one of said surfaces when said member is installed, each of said lips having one or more slits extending from said sealing surface and into the material thereof, whereby upon flexing of said sealing surfaces the slit or slits will open to form a pressure receiving pocket or pockets.

9. A sealing member of resilient material adapted to cooperate with the surface of a cylindrical bore and to prevent leakage along the latter, said sealing member comprising an annular portion of which the peripheral surface is a surface of revolution of which the generatrix slopes outwardly from a line parallel to the axis of such annular portion and spaced from such axis by the radial dimension of the cylindrical bore with which such sealing member is to cooperate, said sealing member having the outer surface of such annular portion slitted whereby, upon the flexure of said annular portion by insertion thereof into such a cylindrical bore, a pressure receiving pocket will be formed by the causing of said slit to gape.

JOSEPH F. JOY.

REFERENCES CITED

The following references are of record in the file of this patent:

UNITED STATES PATENTS

| Number | Name | Date |
|---|---|---|
| 1,902,247 | Klingloff | Mar. 21, 1933 |
| 2,081,040 | King | May 18, 1937 |
| 2,167,986 | Lignian | Aug. 1, 1939 |
| 2,120,922 | Rasmussen | June 14, 1938 |
| 1,555,023 | Prokofieff | Sept. 29, 1925 |
| 2,046,724 | Buffington | July 7, 1936 |
| 2,201,372 | Miller | May 21, 1940 |
| 2,099,241 | Stewart | Nov. 16, 1937 |

FOREIGN PATENTS

| Number | Country | Date |
|---|---|---|
| 478,136 | British | 1938 |
| 213,102 | Swiss | 1942 |
| 528,208 | British | 1940 |